United States Patent [19]

Lehmann

[11] 4,291,719

[45] Sep. 29, 1981

[54] VALVE SUB-ASSEMBLY

[75] Inventor: Wallace K. Lehmann, Hampton, Md.

[73] Assignee: The C. M. Kemp Mfg. Co., Glen Burnie, Md.

[21] Appl. No.: 138,081

[22] Filed: Apr. 7, 1980

[51] Int. Cl.³ ............................................. G05D 11/03
[52] U.S. Cl. ................................. 137/112; 137/454.6
[58] Field of Search .................... 137/112, 113, 454.2, 137/454.6, 533.19, 543.19

[56] References Cited

U.S. PATENT DOCUMENTS

| | | | |
|---|---|---|---|
| 1,859,593 | 5/1932 | Mellin | 137/112 |
| 2,710,023 | 6/1955 | Blackford et al. | 137/543.19 |
| 2,761,463 | 9/1956 | Wagner | 137/112 |
| 2,876,788 | 3/1959 | Shube | 137/112 |
| 3,038,487 | 6/1962 | Gardner | 137/112 |
| 3,155,105 | 11/1964 | Yanna | 137/112 |
| 3,592,215 | 7/1971 | Davis | 137/112 |
| 3,606,907 | 9/1971 | Stenberg | 137/112 |
| 3,913,615 | 10/1975 | Cooper | 137/543.19 |

FOREIGN PATENT DOCUMENTS

| | | | |
|---|---|---|---|
| 2715936 | 10/1978 | Fed. Rep. of Germany | 137/112 |
| 101914 | 7/1962 | Netherlands | 137/112 |
| 165235 | 1/1934 | Switzerland | 137/533.19 |

*Primary Examiner*—Martin P. Schwadron
*Assistant Examiner*—H. Jay Spiegel
*Attorney, Agent, or Firm*—Fidelman, Wolffe & Waldron

[57] ABSTRACT

A valve sub-assembly as illustrated by the drawing insertable at a "T" connection in a preformed channel so as to form a multiport valve at the site. The valve subassembly is characterized by a cage structure containing spaced apart tied together wafers with valve seats and sealing elements thereon, and a shuttle with valve face ends thereon caged between the wafers, the shuttle riding from one wafer to the other wafer. The channel wall portion sealed between wafers is converted into a valve body.

The valve sub-assembly includes a face plate attached to the cage structure and spaced apart from the cage structure, so as to site the cage structure in the preformed channel at the "T" connection, the face plate being adapted to seal the channel opening to an outside wall through which the valve sub-assembly is inserted.

2 Claims, 7 Drawing Figures

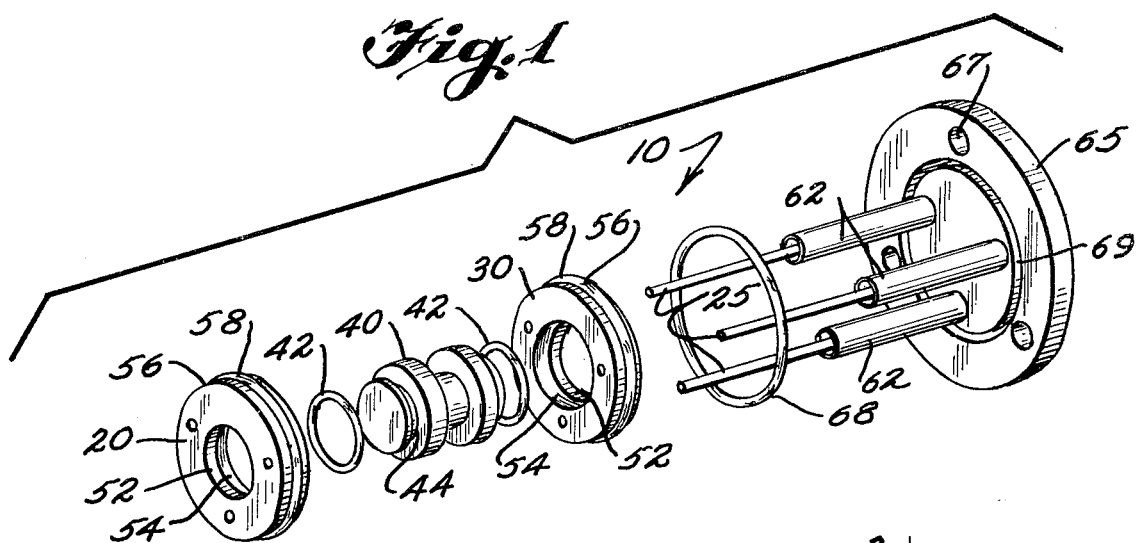
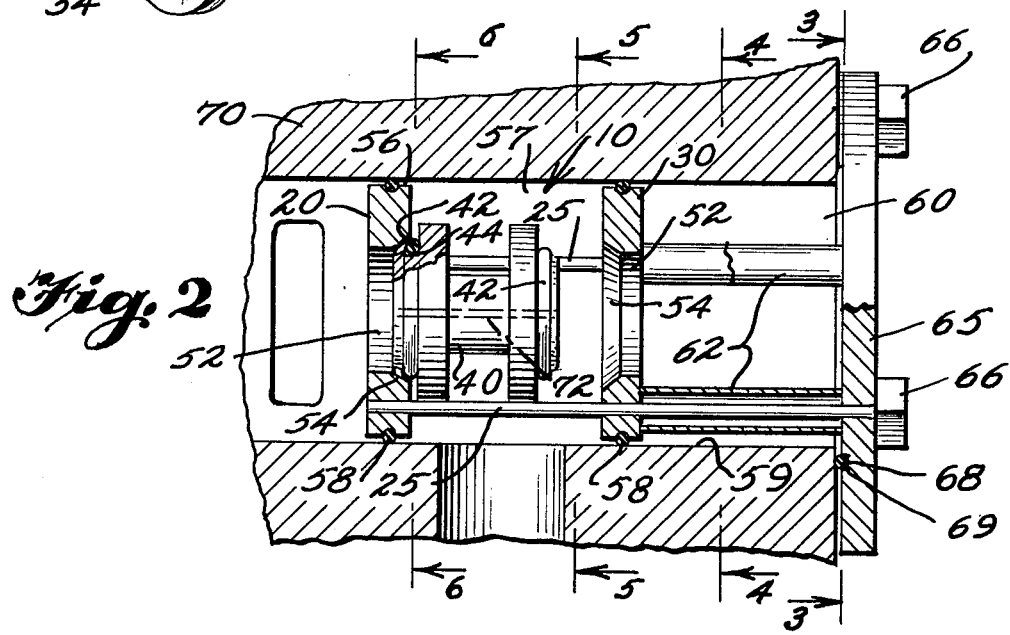
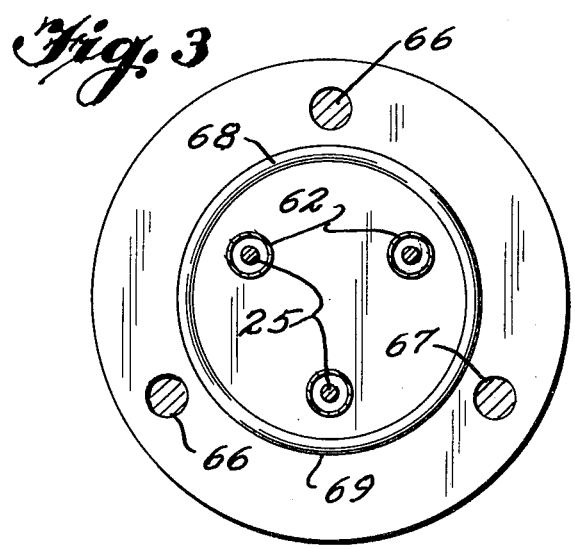
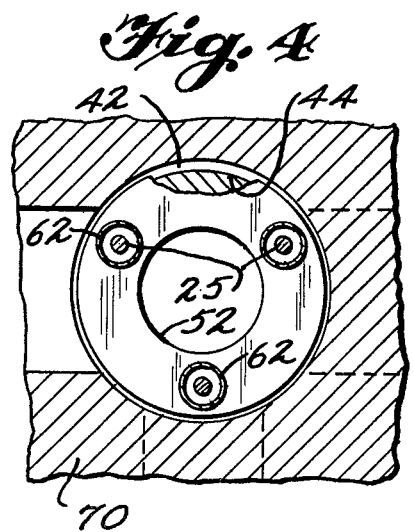

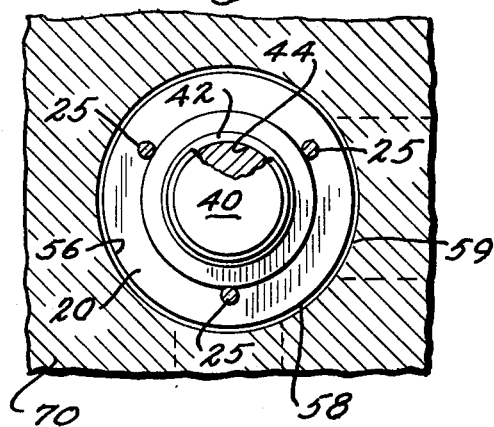
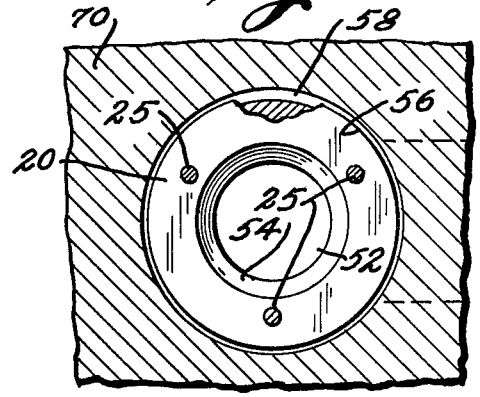
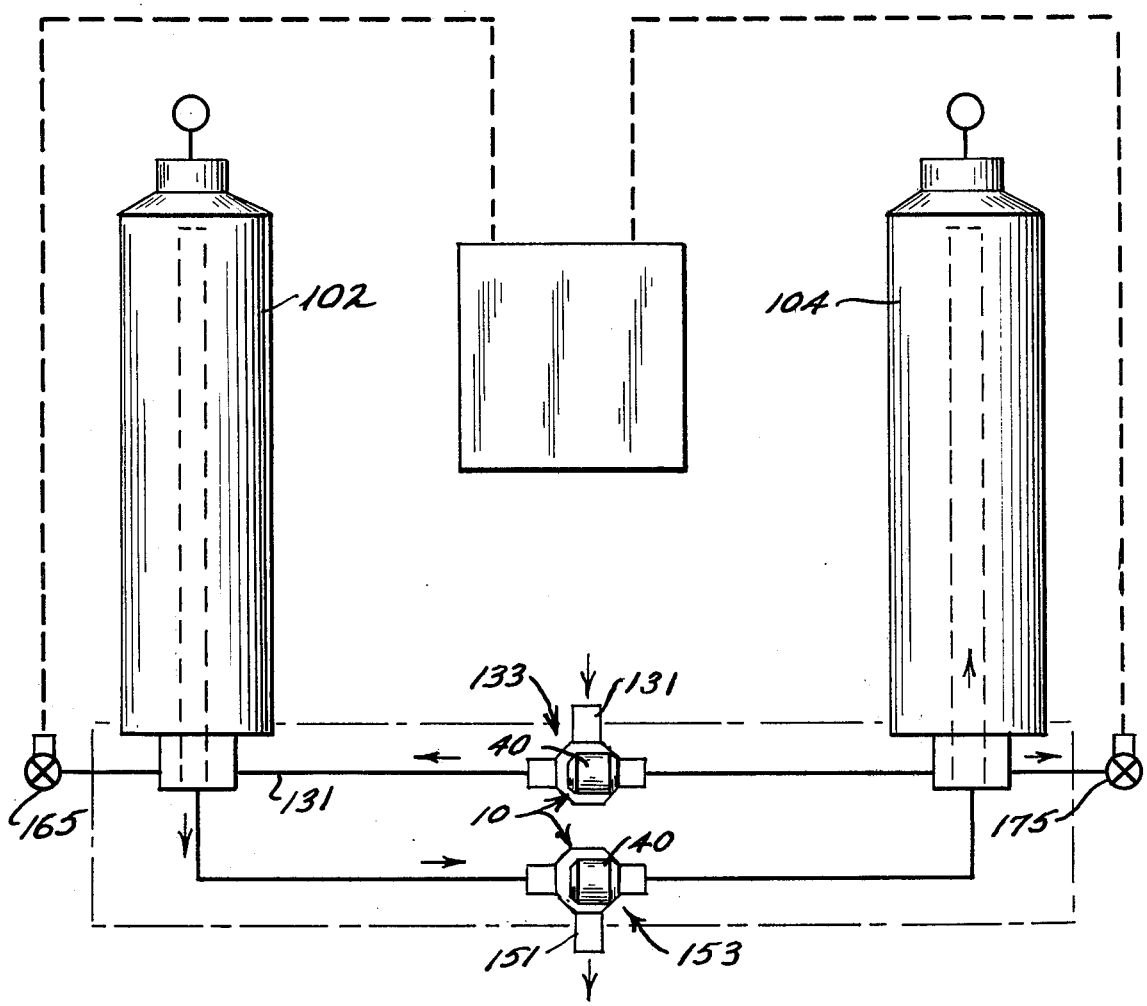

VALVE SUB-ASSEMBLY

INTRODUCTION

This invention relates to valve assemblies and in particular to multiport valves responsive to pressure changes.

BACKGROUND OF THE INVENTION

The industrial arts contain a great many fluid systems requiring multiport valving means directly responsive to pressure changes inside the fluid containing system. And, traditionally, such valves, have been manufactured as discrete components, incorporable into any system requiring the valves by connection to the inlet(s) and outlet(s) of the valve. In short, the necessary components of the valve, namely valve face, valve seat, and valve body are parts of a fully assembled valve combination provided by the manufacturer thereof.

For many fluid systems such state of affairs is satisfactory, but thereby design constraints have been imposed upon the detailed construction of the system as a whole. For example, discrete fluid flow lines e.g., pipes, have become needed to pass fluid to and from the valve combination. To some extent the art is discouraged from constructing fluid systems wherein complex valving are disposed inside bore holes of a casting, and wherein preformed channels inside the casting constitute the (piping) connections to the valve. Substitution of a relatively inexpensive casting for a multiplicity of short lengths of pipe can offer space economy, cost savings and product quality improvement to fabricators of numerous fluid systems.

One particular instance of such a design constraint known to the inventor hereof has been in pressure swing regenerative dryer systems wherein the twin dryer towers in the system have been interconnected through reversing valves by short lengths of pipe. Formation of the interconnections as channels within a cast base, as is suggested in the dryer system described in U.S. Ser. No. 060,103 filed July 24, 1979, was made difficult by the need to build valve seats directly into the channel walls. A more facile cast tower support structure resulted when a valve assembly constructed according to practice of this invention was employed (See Ser. No. 138,158, filed concurrently herewith).

Other fluid systems that have faced comparable design constraints are systems for demineralization of water and swimming pool filtration systems.

RATIONALE OF THE INVENTION

Underlying the rationale of this invention is an appreciation that castings can be made with relatively complex channels therein, and, moreover, additional channels as needed may be formed by drilling bore holes into the casting. Conceptually, at least, valve inlet and outlet means may be fluid flow channels within a casting, with the valve body being a channel wall. Still needed to complete the valve combination are valve seating means and valve face means, to which must be added however, means for locating the valve at the proper site in the channel of the casting and means for sealing the valve inside the channel.

The present invention provides a valve sub-assembly adapted to form a pressure actuated multiport valve inside a bore hole.

BRIEF STATEMENT OF THE INVENTION

Briefly stated, the valve sub-assembly of the present invention comprises a pair of spaced apart wafers each containing a valve port opening therethrough surrounded by a valve seat, and sealing means on the periphery of the wafer. A shuttle capable of shuttling between the wafers, the shuttle having valve face means at the ends thereof, is disposed between the wafers. The wafers are secured together and spaced apart by tie means, e.g., by tie rods, that serve both to cage the shuttle and to center the shuttle to the wafers.

Normally, the valve sub-assembly is to be positioned in a bore hole inside a casting at the connection between a cast in (or drilled in) channel and the bore hole, the connection constitutes a multiport "T" straddled by the wafers. In such instances, the wafer facing the outer surface of the casting is provided with one or more spacer elements that terminate in a face plate adapted to seal the opening through which the valve sub-assembly is inserted. The length of spacer serves to locate the valve assembly at the proper depth within the bore hole, so as to straddle the "T".

DISCUSSION OF THE INVENTION

For further discussion of the present invention, reference is made to the attached drawings wherein:

FIG. 1 is a diagrammatic exploded view of a valve sub-assembly.

FIG. 2 is a side section of the valve sub-assembly in place inside a casting shown in partial section thereof.

FIG. 3 is a section taken along line 3—3 of FIG. 2.

FIG. 4 is a section taken along line 4—4 of FIG. 2.

FIG. 5 is a section taken along line 5—5 of FIG. 2.

FIG. 6 is a section taken along line 6—6 of FIG. 2.

FIG. 7 is a diagrammatic view of a pressure swing regenerative dryer to which the present valve assembly is adapted.

Referring now to the drawing and in particular to FIGS. 1 and 2, it may be seen that the valve sub-assembly 10 is made up of wafers 20, 30, tie rods 25 and a shuttle 40 caged in by wafers 20, 30 ad tie rods 25. As in apparent in the drawings, rods 25 which, for example, are welded to the wafers 20, 30 function as follows: to center and guide shuttle 40 in its back and forth movement between wafers 20, 30; to link and align wafers 20 and 30; and, to space wafer 20 from wafer 30 whatever distance is required for the valving purpose served by sub-assembly 10.

In the preferred mode of valve sub-assembly illustrated by the drawing, each wafer has therein a central valve port 52 surrounded by a valve seat 54 on which the valve face on the end of shuttle 40 seats.

The valve face end of shuttle contains a groove 44 in which an "O" ring 42 fits. As can be seen in FIGS. 2, 5 and 6, the "O" ring 42 rests against valve seat 54, and, therefore, "O" ring 42 amounts to the valve face on shuttle 40.

Around the periphery 56 of each wafer 20, 30 is an "O" ring 58 which serve to seal valve sub-assembly 10 inside bore hole 60, acting as the sealing means elements to prevent fluid from leaking around the wafers bypassing valve ports 52. The sealing action of "O" rings 58 converts the portion 57 of the casting channel wall which lies between wafers 20 and 30 into the valve body. Normally the valve sub-assembly 10 will be inserted into a preformed smooth walled channel e.g., bore hole 60, in casting 70, a portion of which is illustrated in FIG. 2.

One of the wafers, in this instance, the wafer 30, has secured thereto one or more spacers 62, the spacers 62 serving to site the valve sub-assembly 10 in the channel 60. A convenient, and preferred, expedient is formation of spacers 62 from tube stock. The tubes 62 slip around tie rods 25, as is illustrated in the drawing, so that the tie rods 25 may extend through apertures in a face plate 65 that seats on a face (side, top or bottom) surface of the casting or the like 70 e.g., a molded object. The tie rod ends may be threaded and nuts employed to lock the components of valve sub-assembly 10 together into a complete unit. The face plate 65 is attached to the wall of casting 70 e.g., by bolts 66, threaded into tapped holes 67. Face plate 65 is provided with a groove 69 and an "0" ring 68 is disposed in groove 69 so as to seal the face plate 65 on the casting surface.

The construction herein illustrated for valve sub-assembly 10 employs tie rods 25 as the basis for assembly of the components, i.e., for securing wafers 20, 30 together at whatever spacing distance is desired, and for securing face plate 65 in the assembly at whatever spacing distance is desired. If desired, tie rods 25 may be welded to face plate 65.

The valve sub-assembly of this invention is particularly well adapted to systems where multiport valves are employed. The three port mode of valve illustrated in the drawing is adapted to instances wherein alternative fluid flow channels exist. For example, twin tower dryer systems, such as the systems schematically shown in FIG. 7, employ a pair of drying towers 102, 104 to dry compressed air or some other gas. One tower e.g., 102, is employed for drying while the other tower 104 is being regenerated. Such a system can operate with a pair of three port valves 133, 153 constructed according to practice of this invention. An air inlet channel 131 for compressed gas connects to valve 133 at a port situated between the wafers; the gas is directed through the port opening of the left side wafer to drying tower 102. Dried gas from the tower 102 flows through the port opening in the left side wafer of valve 153 to leave by way of outlet channel 151. Pressure differences inside the drier system hold the shuttles inside valves 133, 153 against the right side wafers.

Tower reversal is effectuated by sequential operation of solenoid valves 165, 175 so as to create a sufficient pressure differential inside the drier system to unseat the shuttles 40 from the right side wafer and move them from right to left to seat against the left side wafer sealing off the port openings therein leading to tower 102 against flow of gas, and opening the ports in the right side wafers and thereby tower 104 to flow of gas.

FIG. 2 also illustrates an expedient possible with the valve assembly of the present invention that is particularly useful for dryer tower systems. When desired, a bleed flow of fluid into the closed-off side of the multi-port valve may be obtained by drilling a small orifice axially through the shuttle as is illustrated by bleed passage way 72 through the shuttle 40. In the drier system of FIG. 7, such a bleed orifice would be incorporated into valve 153.

The advantages of the valve sub-assembly of this invention may be appreciated from consideration of the foregoing exemplary use for the valve assembly in twin dryer tower systems.

Thus, the tie means e.g., tie rods 25 on which wafers 20, 30 and face plate 65 are mounted and on which shuttle 40 rides are also a cage concentric with the channel wall spaced radially inward of the channel wall sufficiently for fluid to flow around shuttle 40 to or from a port opening in the channel wall. Flow to or from the valve port opening in either wafer. Since tie rods 25 both cage and guide shuttle 40, lateral forces associated with the flowing fluid cannot dislodge shuttle 40 from its valve seat and otherwise disrupt the valve from its intended operation.

As can be appreciated from FIG. 2, the fluid flow port in the channel wall portion 57 between wafers 20 and 30 enters the channel laterally. The flow passageway in casting 70 that includes the channel wall portion 59 between wafer 30 and face plate 65 will be L-shaped i.e., as an elbow bend built into the casting, as is shown in FIG. 4. The fluid flow connection to wafer 20, may also be L-shaped i.e., as an elbow built into the casting as is illustrated in FIG. 2 and in shadow in FIG. 4.

In the mode of casting illustrated in the drawing, the fluid flow channel could enter casting 70 at one, two or three surfaces, and bore hole 60 from a fourth surface, which illustration evidences the minimal extent which a proposed employment of valve sub-assembly of this invention in a casting would impose design constraints upon the casting.

The valve sub-assembly of this invention is particularly useful for fluid systems containing a multiplicity of closely adjacent valved flow lines. Then incorporation of the valving within a casting according to practice of this invention, can eliminate many pipe connections to the valves, such being schematically illustrated in FIG. 7. If the casting can also serve other functions, such as for example, be a support structure on which major components of the system are mounted e.g., dryer towers, the valve sub-assembly of this invention is all the more advantageous.

It should be appreciated that the foregoing description of a particular casting, and use of the valve sub-assembly of this invention in a dryer system are entirely exemplary. The shape of the flow channels in a casting and the nature of the fluid system wherein the valve sub-assembly is employed form no part of this invention.

The above discussion of the valve sub-assembly of this invention has been couched in terms of employment inside a casting. It should be appreciated that castings may be of metallic or non-metallic materials. Also, large moldings e.g., of thermoset resin might well be where the valve sub-assembly finds use.

I claim:
1. A valve sub-assembly adapted for insertion inside a channel in a casting or the like which comprises:
   a pair of wafers and tie means securing said wafers face-to-face spaced apart, each wafer having at the periphery thereof sealing means for preventing fluid flow around said wafer, each wafer having a valve seat and a valve port opening centrally of each said wafer;
   a shuttle having valve face means thereon at each end thereof caged inside said tie means and guided thereon, said shuttle being adapted for movement between wafers from the valve seat of one wafer to the other in response to fluid pressure changes; and,
   a face plate secured to one wafer spaced apart therefrom a predetermined distance said face plate including means for creating a sealing attachment to a channel opening in which the valve sub-assembly is inserted,
   said tie means being rods extending from one wafer through the other wafer to said face plate serving to secure wafers and face plate together.
2. The valve assembly of claim 1 including tubular spacer means mounted on said tie rods between face plate and wafer to fix the spacing therebetween.

* * * * *